United States Patent [19]

Smith

[11] 3,898,443

[45] Aug. 5, 1975

[54] MEMORY FAULT CORRECTION SYSTEM

[75] Inventor: Robert McKee Smith, Nashville, Tenn.

[73] Assignee: Bell Telephone Laboratories, Incorporated, Murray Hill, N.J.

[22] Filed: Oct. 29, 1973

[21] Appl. No.: 410,457

[52] U.S. Cl. ................ 235/153 AM; 340/146.1 BA

[51] Int. Cl.[2] .................... G06F 11/10; G11C 29/00

[58] Field of Search ............... 340/172.5, 146.1 BA; 235/153 AM

[56] References Cited

UNITED STATES PATENTS 3,222,653 12/1965 Rice ................................ 340/172.5

3,772,652 11/1973 Hilberg ........................... 340/172.5

*Primary Examiner*—R. Stephen Dildine, Jr.

*Attorney, Agent, or Firm*—David H. Tannenbaum

[57] ABSTRACT

A memory system is disclosed which is internally self-correcting when a memory failure occurs. Upon detection of a memory output error, the bit which is incorrect is automatically identified and the output from the memory column which provided the error bit is inhibited. At the same time, a spare memory column is activated and the information which was initially in the error column is transferred to the now activated spare column. The output of the spare column is then directed into the bit location of the inhibited column.

7 Claims, 7 Drawing Figures

MEMORY FAULT CORRECTION SYSTEM

FIELD OF THE INVENTION

This invention relates to memory systems and, more particularly, to an internally self-correcting memory.

BACKGROUND OF THE INVENTION

As the use of electronic memories becomes more and more widespread, errors resulting from improper memory bits become increasingly more intolerable. In the past, several arrangements have been devised to cope with the memory error bit problem. Primarily, these arrangements have been based upon error correction codes where the output of a memory, taken word by word, is reviewed to determine if an error is present. Upon detection of an error, the error correction code comes into play and the improper word is rehabilitated.

The basic problem with such an approach is that the external symptom of the memory error is treated without actually correcting the internal source of the problem. Thus, assuming a permanent memory bit malfunction, every time the word (byte) containing the bad bit is read from the memory the error correction code is called upon to correct the problem. Such a procedure, while accomplishing the desired result, does so at the expense of time.

To overcome this problem there exists several arrangements where the output word of a memory is checked to determine if it is in error. When errors are found the word is corrected, again using error correction techniques, and the corrected word is transferred to a new location within the memory. The new location is then used whenever the memory is accessed at the location of the original word. Such a scheme works well but requires sophisticated circuitry in the translator section of the memory and also requires that an extra operation be performed before information is obtained from the memory. This extra step is again time consuming.

It is therefore an object of my invention to establish an arrangement whereby, upon the detection of a memory error, the internal bits of the memory are rearranged so that upon any subsequent use of the predetermined error bit the output of the memory will be correct.

It is a further object of my invention to rehabilitate an electronic memory once an output error is detected in a manner preserving parity and in a manner which eliminates the need for the continued use of errorcorrecting codes and special memory translator routines.

SUMMARY OF THE INVENTION

Electronic memories typically consist of a matrix array of bits organized into columns and rows. Upon selection of a given row, a word (byte) is obtained from the memory which word is composed of data bits, one bit from each column. In the embodiment the memory is arranged to have at least one spare column in addition to the number of columns necessary for data bits and parity checking.

In operation, when a word is obtained from memory, a parity checking scheme is employed to determine if the output word is correct. When a parity error is detected, it is determined which bit and, hence, which column is in error and, based upon this determination, the output of the error column is inhibited.

Thus, assuming a 16-bit word, one parity bit and one spare bit, the memory would have 18 columns. If, for example, it is determined that the second bit of a word is in error, the output of the second memory column is inhibited. At the same time, the 18th (spare) column is enabled and the information which was originally stored in the second column is transferred to the 18th column. From this point the memory functions normally except for the fact that the bits read from the 18th column are now substituted into the second bit position of each obtained memory word.

Using this approach, the detected error column can then be physically removed from the memory and repaired or a new memory column substituted therefor, all while the memory continues to function. Under such an approach the economic ramifications are important. This results from the fact that a typical 64,000-word memory without this technique would have a mean time between failure (MTBF) of approximately six years. Assuming a one-day replacement time for any memory column found in error, the MTBF, using this new approach is increased beyond the point where other system components, such as a processor having a MTBF of 30 years, can be expected to fail first. Thus, memory duplication is eliminated and reliability is increased.

Thus, it is a feature of my invention to rehabilitate a memory by reorienting the internal bits of the memory to bypass detected fault conditions.

It is a further feature of my invention to correct automatically memory output errors by rearranging the internal bit order of the stored memory data so as to increase substantially the memory MTBF without structurally changing the memory and without the use of error correction codes.

DESCRIPTION OF THE DRAWINGS

The operation and utilization of the present invention will become fully apparent from the following detailed description, taken in conjunction with the accompanying drawings, in which.

Figure 1:
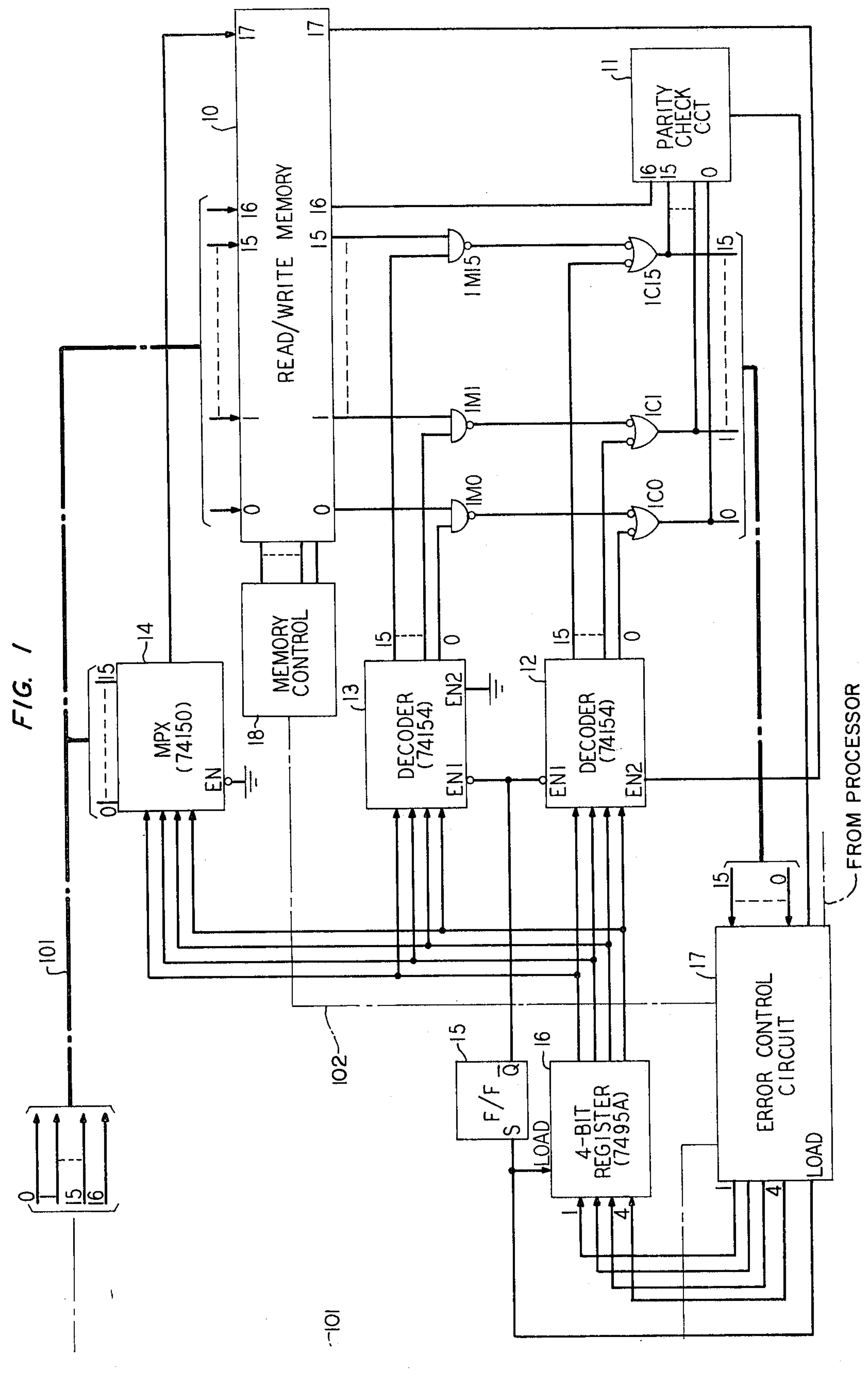
FIG. 1 shows in block diagram form an exemplary embodiment utilizing a read/write memory.
Figure 2:
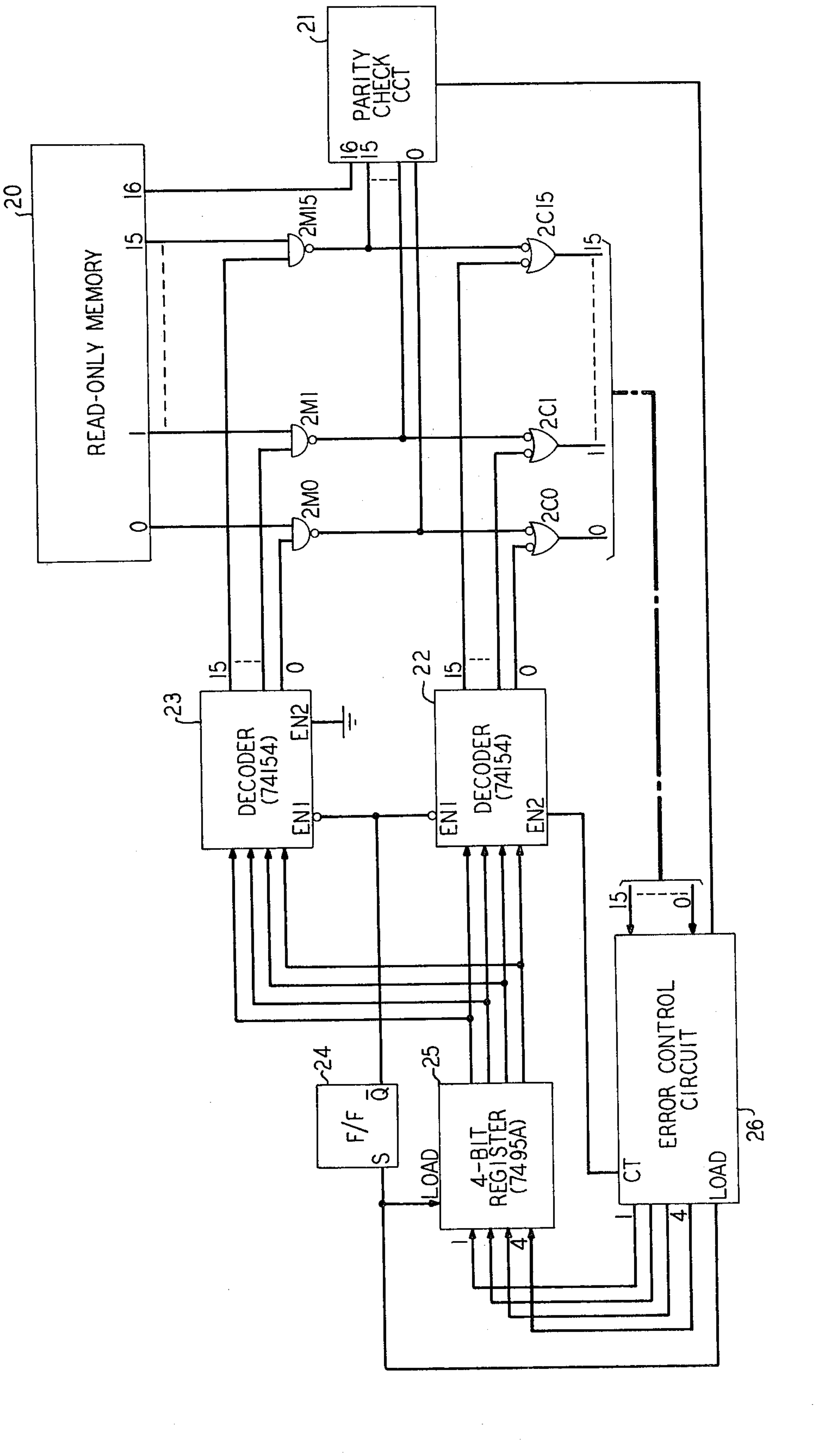
FIG. 2 shows in block diagram form another exemplary embodiment utilizing a read-only memory.
Figure 3:
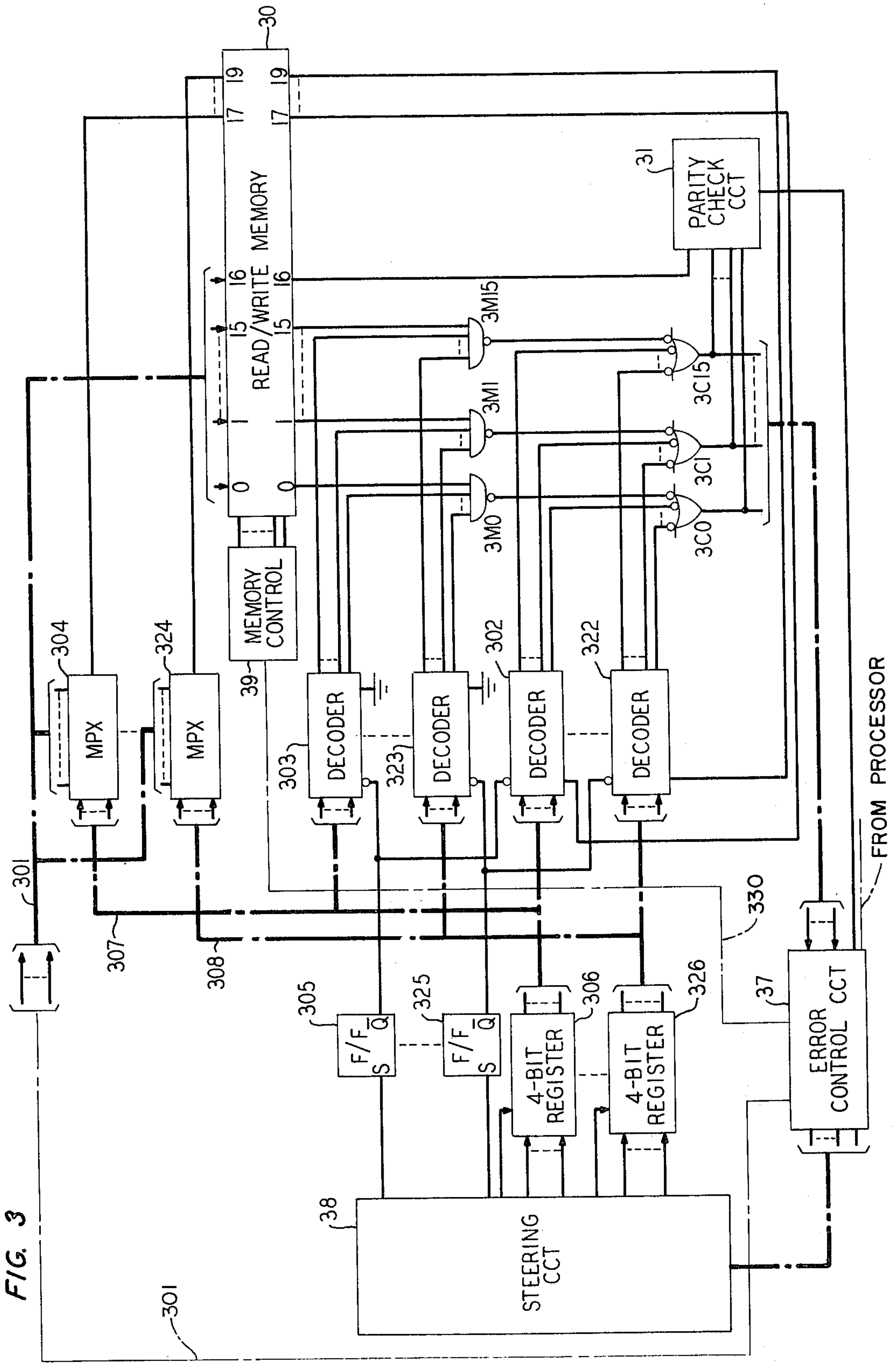
FIG. 3 shows the use of multiple spare memory columns.

As an aid in the construction of a memory system which is internally self-correcting, the numbers in parentheses in certain of the elements shown in FIGS. 1, 2 and 3 are integrated circuits commercially available. One source of data on the exact configuration of each of these circuits is The Integrated Circuits Catalogue for Design Engineers, published by Texas Instruments, Inc. It should be noted, however, that numerous other circuit packs may be utilized advantageously, other than those specifically set forth, so long as each element is able to perform the function hereinafter to be described therefor.

DETAILED DESCRIPTION

Prior to becoming involved in the various details of the overall system, it would be well to become familiar with the operation of some of the individual elements shown. In this respect, the decoders, such as decoders 12 and 13, operate to receive data bits on the input 4 leads, which data bits represent in binary format any number from 0 through 15. When the EN1 input lead of a decoder is low, the signal on the output lead associated with the decoded primary input follows exactly the signal on the EN2 input lead. For example, assuming input bits 0110 (decimal 6) on the input leads to decoder 12, if the EN2 input lead is low, output lead 6 would also be low. If, however, the EN2 input lead is high, then output lead 6 would also be high. The output is inverted on passing through the buffer gate 1C6(not shown).

Multiplexer MPX 14 operates in the reverse manner from the decoder by transferring the signal which is on any one of the input leads 0 through 15 to the single output lead dependent upon the decoded decimal equivalent of the binary-coded input. Accordingly, in the example where the input leads have the binary bits 0110 thereon, the signal H or L on lead 6 of cable 101 would be transferred to the output lead inverted. The bit is reinverted when it is read.

Parity check circuit 11 operates in well-known fashion such that leads 0 through 16 are reviewed for parity thereon and when a parity failure occurs an output signal is provided. There are numerous circuits available to perform such a function, some of which circuits are based upon the concept of single error detection shown in U.S. Pat. No. Re. 23,601 issued on Dec. 25, 1952 to R. W. Hamming et al.

Figure 4:
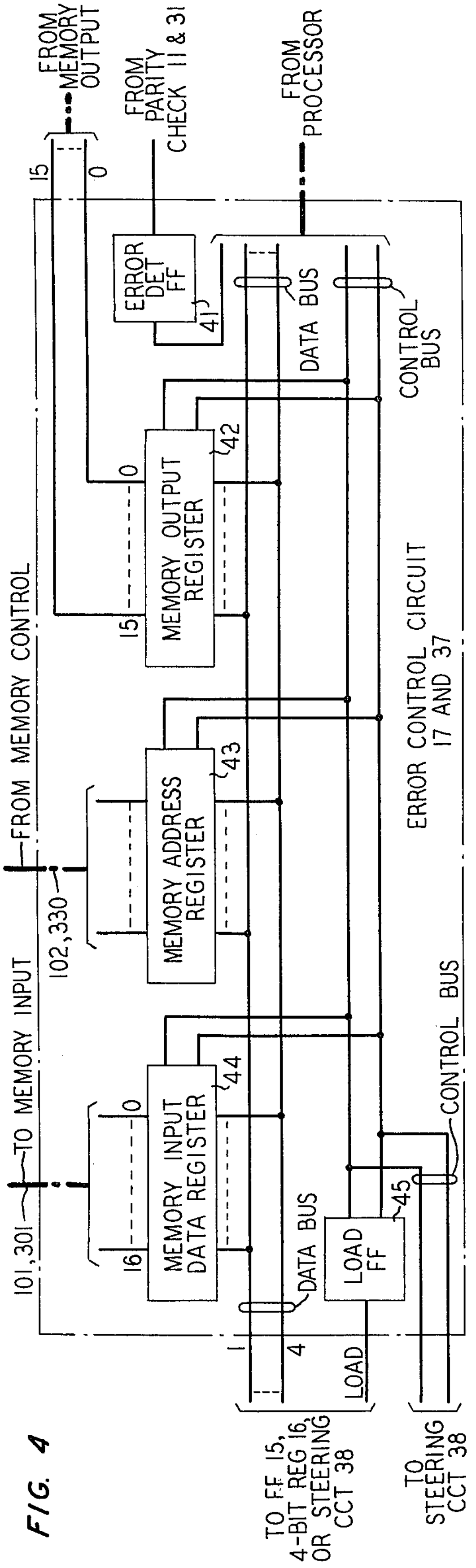
FIGS. 4 and 5 detail the error control circuit and the steering circuit.
Figure 6:
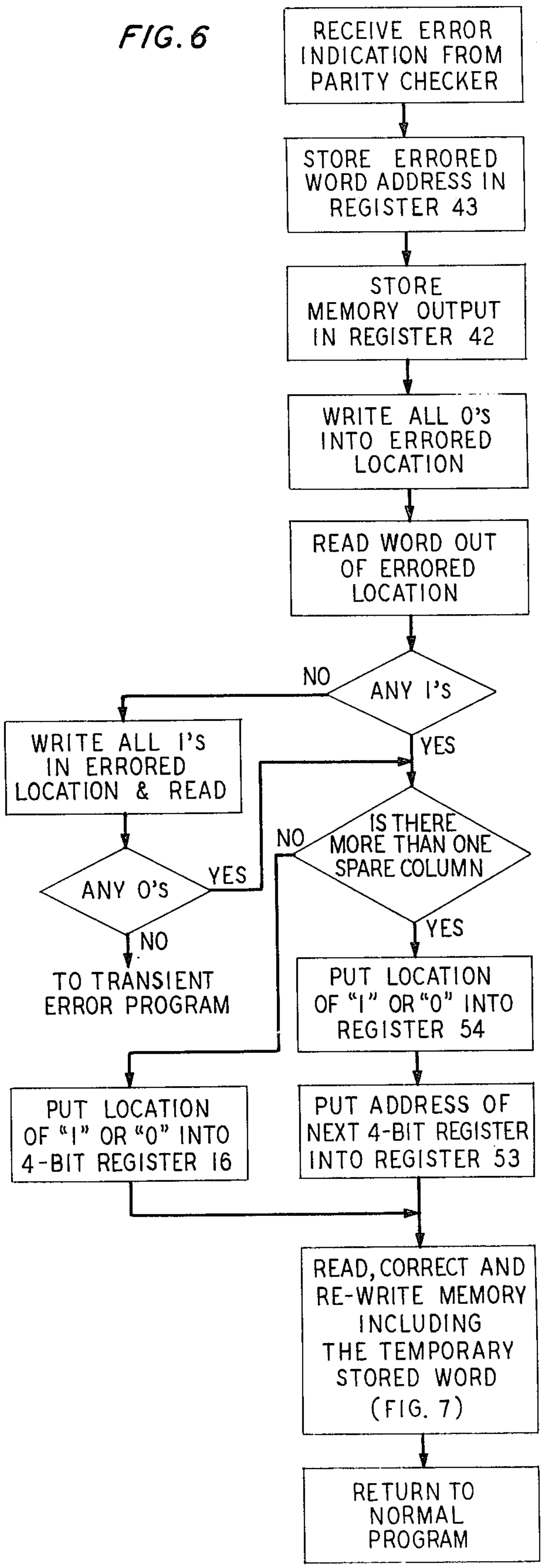
FIGS. 6 and 7 show an algorithm for determining the error bit.
Figure 7:
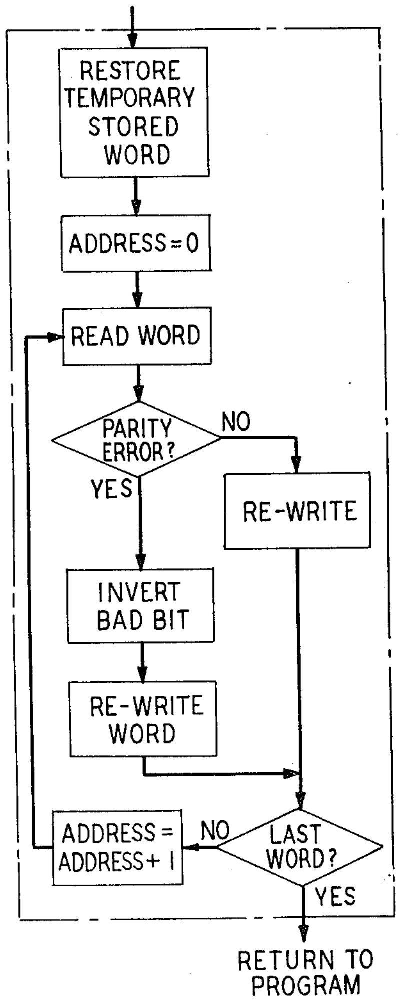

Error control circuit 17 operates in response to a signal from parity check circuit 11 to obtain the 16-bit output word to determine which bit is in error. Several techniques can be used to accomplish such a result, including writing into the memory all 1's and checking the output, and then writing in all 0's and again checking the output. Another method for determining which bit is in error is to use the techniques taught in the abovementioned R. W. Hamming et al patent. FIGS. 6 and 7 show a still further method of determining which bit is in error by using an algorithm, which algorithm is executed by the processor associated with the memory which is to be corrected. The algorithms shown in FIGS. 6 and 7 are straightforward and perform such that when an error is received from the parity circuit, the processor operates to store the error word address in memory address register 43 and to store the memory output in register 42, both of which registers are contained within error control circuit 17 as shown in FIG. 4. The processor then proceeds to write all 0's into the error location via the input cable 101 shown in FIG. 1. The word is read out of the error location and checked to see if there are any 1's. If there are no 1's, then the processor writes all 1's into the error location and again reads that location to determine if there are any 0's. If there are no 0's, then the error was a transient error and the program resumes. However, if, after reading, 0's and 1's are detected, or after reading 1's any 0's are detected, it then remains to determine which bit is in error. Such a determination when using all 1's and all 0's is straightforward and can be enabled using any one of several bit matching techniques well known in the art, as, for example, EXCLUSIVE OR followed by a jump on zero bit test. Upon determining which bit is in error, a binary output is formed having a value equivalent to the bit position of the error data bit found. Thus, assuming that the data bit in position 2 of a memory output word is determined to be the error bit, then the output of error control circuit 17 would be 0010. When this information is available, the LOAD lead goes low thereby setting 4-bit register 16 with the binary bits 0010, which is the binary representation of the bit position of the determined error data bit. Flip-flop 15 is also set at this time from the signal on the LOAD lead.

Continuing in FIG. 1, in a typical situation, read/write memory 10 is loaded from information provided from an input over leads 0 through 16 of cable 101. This information is stored in columns 0-16 of read/write memory 10 under control of memory control 18 in well-known fashion. EAch 17-bit word received is stored therein. The circuitry of memory control 18 for accomplishing this is not detailed herein but is straightforward and well known in the art.

At this point column 17 is left blank while column 16 contains the parity checking bits for each word. Upon the readout of a word from memory, information is transferred from columns 0-15 of read/write memory 10 to one input of NAND gates 1M0 through 1M15. At this time outputs 0 through 15 of decoder 13 are high, thereby causing the outputs of gates 1M0 through 1M15 to be the inverse of the bit signals received from read/write memory 10. Thus, assuming a high on output lead 1 of a given word obtained from read/write memory 10, the output of gate 1M1 would go low. This low is applied to an inverting input of NAND gate 1C1. The high on the 1 output of decoder 12 is applied to the other inverting input of NAND gate 1C1, thereby causing the output of gate 1C1 to be high. This is the exact data bit which was obtained from read/write memory 10, namely, a binary 1.

In similar fashion, if bit position 2 of an obtained word from read/write memory 10 is low, the output of gate 1M2 would be high causing the output of gate 1C2 to be low. Again, the data bit in memory output position 2 would correspond exactly to the obtained data bit from column 2 of read/write memory 10.

Assuming that parity check circuit 11 determines that the obtained word, as observed at the output of gates 1C0 through 1C15, is correct then that word would be utilized in a straightforward manner. However, if, in parity check circuit 11, it is determined that one of the bits is in error, a signal is provided which inhibits further processing and which enables error control circuit 17. Error control circuit 17 then functions, as discussed above, to determine which one or ones of the bits is in error.

Now let us assume that the data bit in bit position 2 is determined to be the error bit. Accordingly, error control circuit 17 provides at the output thereof the binary code 0010 (decimal 2), which code is transferred to 4-bit register 16. Upon the enabling of the LOAD lead from error control circuit 17, the binary code 0010 is stored in the register. At this point, flip-flop 15 is also enabled, thereby causing the EN1 input of decoders 13 and 12 to go low. The output of 4-bit register 16 now has thereon bits 0010 and this information is communicated to the input of decoder 13. Since input EN2 of decoder 13 is low, output 2 thereof also goes low thereby forcing the output of NAND gate 1M2 high. In this manner, data from column 2 of read/write memory 10 is inhibited.

At the same time, multiplexer MPX 14 operates from the binary data provided by 4-bit register 16 to connect lead 2 of cable 101 through the multiplexer to the output lead, which lead is connected to column 17 of read/write memory 10.

Memory load data is then transferred from an exterior source over cable 101 to reload read/write memory 10. However, at this time the information which is received over lead 2 of cable 101 is connected through multiplexer MPX 14 to column 17 of read/write memory 10. Thus, at the completion of the load phase, column 17 contains data bits which are the same as the data bits but inverted which should have been loaded in column 2. At this point conventional operation of the memory is resumed and whenever a word is obtained from memory the data bits from column 17 are provided to the EN2 input of decoder 12. The inverted bits are then transferred through decoder 12 to output 2 thereof under control of binary code 0010 as provided by 4-bit register 16. There bits are reinverted by gates 1C0-1C15.

Thus, for example, assuming a binary 1 (high) in the bit position of column 17, this high would be applied, via lead 2 of decoder 12, to an input of NAND gate 1C2. Since both inputs of NAND gate 1C2 are high, the output is low. Accordingly, it is seen that the data bit information in column 17 is substituted for the data bit information previously available from inhibited column 2. This operation continues as long as flip-flop 15 is set and the entire error column 2 of read/write memory 10 can be replaced while the memory is being operated. When flip-flop 15 becomes reset, the memory output is again obtained from only the first 16 columns of the memory, as previously described.

It should be noted that if flip-flop 15 and 4-bit register 16 are constructed using latching devices, such as magnetic latching relays, the memory would continue in the same mode after a power failure. Thus, the change to a spare column or columns could be accomplished in a semipermanent manner.

Read-Only Memory

FIG. 2 shows the rehabilitation of error columns in a read-only memory. Upon detection of an error by parity check circuit 21, error control circuit 26 is again enabled. Error control circuit 26 functions in the same manner as previously described by supplying the binary-coded decimal equivalent of the error column to 4-bit register 25 while at the same time setting flip-flop 24. This operation has the effect of inhibiting the detected error column by providing a low signal to one of the gates 2M0 through 2M15 associated with the detected error column. Since read-only memory 20 cannot be changed, it is necessary for error control circuit 26 to reconstruct the faulty bit with either a zero or a one in a straightforward manner and to provide such reconstructed bit over lead CT to the EN2 input of the decoder 22. This bit is then passed through the decoder 22 to the output lead (0 through 15) associated with the binary input provided from 4-bit register 25. In this manner, the memory output word is corrected on a word-for-word basis.

Additional Spare Columns

Figure 5:
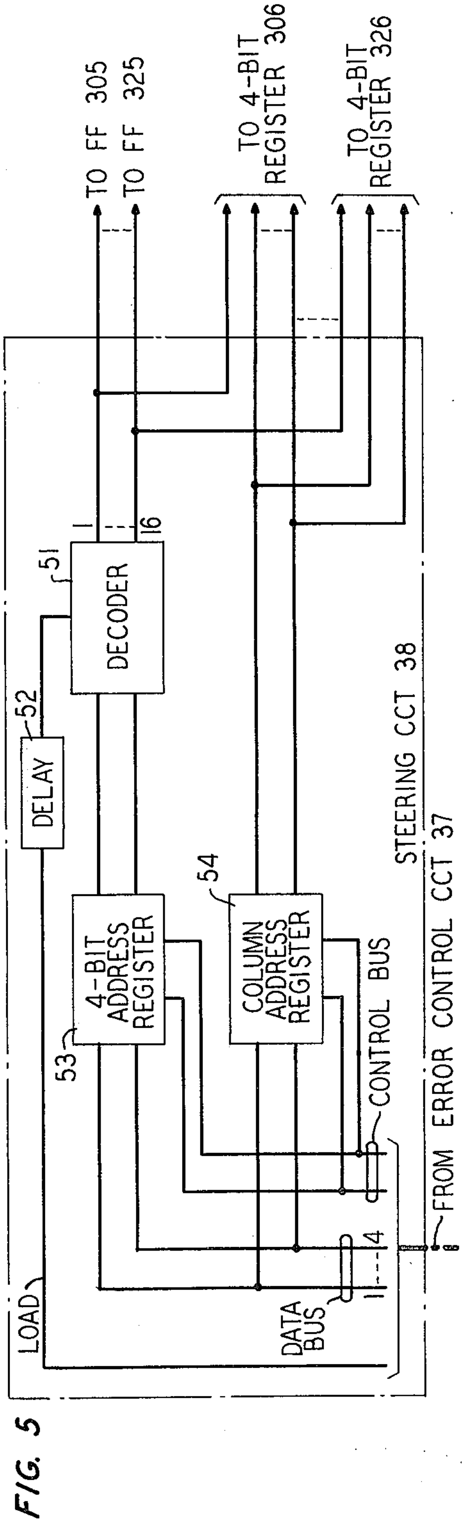

FIG. 3 shows the situation where more than one spare column is utilized. As shown, upon detection of a parity error by parity check circuit 31, error control circuit 37 provides the binary-coded output representative of the decimal position of the error bit in the manner previously described. This coded output, together with the load signal, is provided to steering circuit 38 and directed to any idle one of 4-bit registers such as registers 306 and 326, each of which registers is associated with one of the spare memory columns, 17 through 19. For example, assume that the first bit of a word is found to be in error; then error control circuit 37 would provide the binary bits 0001 to steering circuit 38 which, in turn, would provide these bits to 4-bit register 306, at the same time setting flip-flop 305. FIG. 5 shows in block diagram form the internal control of steering circuit 38. Thus, when the address of an error word is determined by error control circuit 37 in the manner previously described, the binary code representative of the error location is provided to the column address register 54 of steering circuit 38. At the same time the processor determines from a look-up table which of the 4-bit registers are idle. This determination can be made either from a memory or from an interrogation of the flip-flops (such as flip-flop 305) associated with each 4-bit register. When the address of an idle 4-bit register has been selected, that address is provided from error control circuit 37 to steering circuit 38 directly to the 4-bit address register 53. When the load lead is enabled, delay circuit 52 in conjunction with decoder 51 serves to channel the address stored in column address register 54 to the selected 4-bit register such as 4-bit register 306. At the same time, the flip-flop associated with the enabled 4-bit register, such as flip-flop 305 associated with 4-bit register 306, is set. Setting flip-flop 305 controls the reconfiguration of the memory.

Decoder 303, operating from now set flip-flop 305 and binary input 0001 from 4-bit register 306, provides a low over lead 1 to the input of gate 3M1 thereby making the output of that gate permanently high or, in effect, turning off gate 3M1, thereby inhibiting the output of column 1 of memory. At the same time, decoder 302 would connect the inverse of the data bit in column 17 of read/write memory 30 to one input of gate 3C1 so that any information provided from column 17 passes through decoder 302 and gate 3C1 to the first bit position of any obtained memory output word. The memory can then again be loaded from cable 301 in the manner previously described with multiplexer MPX 304 acting to channel the data bits of memory column 1 to memory column 17.

Now assuming a second error is detected by parity check circuit 31, error control circuit 37 would again provide the binary-coded equivalent of the detected error bit position together with a load signal to steering circuit 38. This time the determined binary digits would be loaded into 4-bit register 326 and flip-flop 325 would be set. Thus, assuming an error in bit position 15, the binary output of error control circuit 37 would be 1111, 4-bit register 326 would contain the bits 1111 and flip-flop 325 would be set. Decoder 323, in response to the received bits 1111 and the low on lead EN2, provides a ground over lead 15 to turn off gate 3M15. At the same time, decoder 322, also acting in response to bits 1111, connects column 19 of read/write memory 30 via lead 15 of decoder 322 to an input of NAND gate 3C15. Accordingly, whenever a word is obtained from read/write memory 30, the data bit in position 15 of the obtained word would be the data bit stored in column 19 of memory and not the data bit stored in column 15.

Upon detecting the error, as discussed previously, read/write memory 30 again receives input information over cable 301 for reloading purposes. Multiplexer MPX 324, also acting in response to the bits 1111 from 4-bit register 326 and the enabling of flip-flop 325, removes from cable 301 the bits associated with column 15 and transfers these bits to column 19 of the memory, thereby transferring the information from column 15 to column 19.

Conclusion

Although, in the embodiment shown, when an output error is detected the entire error column is inhibited and the information contained therein transferred to a spare column, the system could be constructed such that inhibiting only occurs on a word-for-word basis. In such an arrangement, a substitution will only occur when an error is detected. Because of the basic simplicity of my memory rehabilitation technique, it is contemplated that those skilled in the art may find it to their advantage to utilize this invention in applications bearing little or no structural resemblance to the version described herein, all without varying from the inventive concept taught.

It should also be noted that, instead of reloading the memory from an external source whenever an error occurs, the data bits of the error column could be transferred directly to the selected spare column. This could be accomplished by first establishing which bit position is in error; then cycling through the memory, row by row, transferring the bit from the error position to the corresponding row of the selected spare column. When a parity error is detected, the assumption would be that the error is in the error column and that bit would be inverted before storage in the spare column. Thus, a correct bit may be reconstructed from the error word and the parity bit.

What is claimed is:

1. A computer memory error correction system comprising a memory having $n + m$ columns and $p$ rows, each row having a unique address and wherein under control of an address associated with any said row a word having $n$ bit positions is obtained from said memory, said word composed of one data bit from one of said $n$ columns of said addressed row, means for checking each obtained word from said memory to detect obtained words having error data bits contained therein, means operable in response to a detected error word for determining which bit position of said word is in error, means for marking the column associated with said determined error bit, means operable in response to a detected error word for selecting one of said $m$ columns of said memory, means for establishing within said selected $m$ memory column at each row thereof data bits identical to the data bits in each corresponding row of said marked column, and means for substituting in each obtained word at the bit position of said marked column the data bit from said selected $m$ column for the data bit from said marked column.

2. The invention set forth in claim 1 wherein said checking means includes a parity check circuit.

3. The invention set forth in claim 2 wherein said parity check circuit is operable to check the parity of said obtained word both before and after said substitution of data bits.

4. The invention set forth in claim 1 further comprising an input for supplying data bits to said memory, and wherein said memory column establishing means includes means for directing data bits from said input to said selected spare column.

5. The invention set forth in claim 1 further comprising means for transferring data bits from one memory column to another memory column, and wherein said memory column establishing means includes said data transferring means.

6. The method of rehabilitating a memory comprising the steps of detecting a memory output error in a word read from memory, determining which bit of said word is in error, inhibiting the readout of the memory bit column associated with said determined error bit, selecting a spare memory bit column, establishing within said selected spare memory bit column the correct data bits which were stored within said error bit column, and substituting in said output word at the bit position of said determined error column the data bit from said selected spare column for the data bit from said determined error column.

7. The invention set forth in claim 6 further comprising the step of checking the output word obtained from memory for the purpose of detecting errors therein after said substitution has occurred.

* * * * *